(12) United States Patent
Curtis et al.

(10) Patent No.: US 9,166,896 B2
(45) Date of Patent: Oct. 20, 2015

(54) SESSION-BASED SERVER TRANSACTION STORM CONTROLS

(71) Applicant: International Business Machines Corporation, Armonk, NY (US)

(72) Inventors: John D. Curtis, Milford, MA (US); Russell Holden, Boxborough, MA (US); Albert J. Morello, Meford, MA (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 13/841,284

(22) Filed: Mar. 15, 2013

(65) Prior Publication Data

US 2014/0280897 A1    Sep. 18, 2014

(51) Int. Cl.
*G06F 15/16* (2006.01)
*H04L 12/26* (2006.01)
*G06F 9/50* (2006.01)
*H04L 12/24* (2006.01)

(52) U.S. Cl.
CPC .......... *H04L 43/0876* (2013.01); *G06F 9/5083* (2013.01); *H04L 41/06* (2013.01)

(58) Field of Classification Search
USPC ......................................... 709/224, 219, 225
See application file for complete search history.

(56) References Cited

U.S. PATENT DOCUMENTS

| 6,662,230 | B1 | 12/2003 | Eichstaedt et al. |
| 6,950,942 | B2* | 9/2005 | Guthery ........................ 713/193 |
| 7,428,232 | B2* | 9/2008 | Park et al. ..................... 370/349 |
| 7,844,278 | B1* | 11/2010 | Ross et al. .................. 455/452.1 |
| 9,043,652 | B2* | 5/2015 | Arndt et al. ...................... 714/37 |
| 2007/0016687 | A1* | 1/2007 | Agarwal et al. ............... 709/238 |
| 2010/0281539 | A1 | 11/2010 | Burns et al. |
| 2013/0091391 | A1* | 4/2013 | Arndt et al. .................. 714/47.1 |
| 2014/0317449 | A1* | 10/2014 | Kohno et al. .................... 714/15 |

* cited by examiner

*Primary Examiner* — Jude Jean Gilles
(74) *Attorney, Agent, or Firm* — DeLizio Law, PLLC

(57) ABSTRACT

A transaction storm detection engine is configured to receive a series of transactions in a data stream for an authenticated network session. The detection engine determines whether the transactions form a transaction storm. In response to determining that the transactions are a transaction storm, metrics associated with the transaction storm are presented. One or more actions may be specified to be applied in a subsequently detected transaction storm.

14 Claims, 10 Drawing Sheets

400

Definition for server name (or * for all): *___

Number of consecutive transactions: 100 with a maximum average 50 milliseconds between.

OR

Consumed processing seconds: 1200

Stream initiated by client, server or either: EITHER

Stream initiated by user/server name (or * for all): *___

Beginning between the following times 08:00 AM and 06:00 PM

FIG. 4

| Storm ID | Server Affected | Originator | Time of Storm |
|---|---|---|---|
| TSID10001 | APPSV001 | TPSV333 | 12/12/2011 08:02:15 AM to 12/12/2011 08:32:11 |
| TSID10002 | APPSV002 | TPSV335 | 12/12/2011 09:12:13 AM to 12/12/2011 10:12:02 |
| TSID10017 | APPSV011 | Wallace Hapgood | 12/12/2011 10:42:15 AM to 12/12/2011 11:50:01 |
| TSID10123 | APPSV001 | TPSV337 | 12/12/2011 11:00:07 AM to 12/12/2011 11:11:02 |
| TSID10223 | APPSV011 | TPSV333 | 12/12/2011 12:57:02 PM to 12/12/2011 01:19:37 |
| TSID39992 | APPSV002 | Conrad Jenkins | 12/12/2011 01:32:11 PM to 12/12/2011 01:39:56 |
| TSID39992 | APPSV014 | TPSV333 | 12/12/2011 02:17:45 PM to 12/12/2011 02:32:14 |
| TSID39992 | APPSV001 | TPSV335 | 12/12/2011 02:33:21 PM to 12/12/2011 02:57:22 |
| TSID39992 | APPSV002 | TPSV333 | 12/12/2011 03:48:37 PM to 12/12/2011 03:54:01 |
| TSID39992 | APPSV001 | Jane Harrison | 12/12/2011 04:23:04 PM to 12/12/2011 05:02:09 |

Context menu at 504: View Storm / Define Action / Storm Detail / Advanced Action

FIG. 5

Specify the action to take:
Action(s) to take:
Once the storm is detected, for every transaction Delay 10 milliseconds after ☐ ~702 before ☒ ~704

OR

Return ____ as a numeric return value

Describe the transaction storm to trigger the above action:
Detected Transaction Storm ID: TSID10017
Definition for server name (or * for all) APPSV011
Number of consecutive transactions: 100 with a maximum average 50 milliseconds between.
OR
Consumed processing seconds: 1200
Stream initiated by client, server or either: CLIENT
Stream initiated by user/server name (or * for all): Wallace Hapgood
Beginning between the following times 08:00 AM and 06:00 PM

802: The following transaction storm has been detected on the server(s) shown
Transaction Storm ID: TSID10017
Server targeted by storm: APPSV011
Storm Time From 12/12/2011 10:42:15 AM
To 12/12/2011 11:50:01 AM
Number of consecutive transactions 19200 with 56 average milliseconds between
Total processing seconds: 3672
Stream initiated by client, server or both: CLIENT
Stream initiated by user/server name: Wallace Hapgood

804: STORM TRANSACTION SUMMARY

| Transaction Type | Count | Total processing seconds | Disk Reads | Disk Writes |
|---|---|---|---|---|
| GET_NOTE_INFO | 17273 | 732 | 243 | 0 |
| OPEN_NOTE | 1170 | 234 | 544 | 0 |
| OPEN_COLLECTION | 1124 | 887 | 422 | 0 |
| UPDATE_MULT_NOTE | 412 | 1819 | 3983 | 3983 |

806: STORM TRANSACTION SEQUENCES

Sequence 1

| | Min | Max | Count: 73 |
|---|---|---|---|
| 1. OPEN_COLLECTION | 1 | 1 | |
| 2. GET_NOTE_INFO | 217 | 1922 | |
| 3. OPEN_NOTE | 341 | 20 | |
| 4. UPDATE_MULT_NOTE | 1 | 47 | |

808: Sequence 2

| | Min | Max | Count: 17 |
|---|---|---|---|
| 1. OPEN_COLLECTION | 1 | 1 | |
| 2. UPDATE_MULT_NOTE | 3 | 5 | |

FIG. 8

Specify the action to take:
Action(s) to take:
Once the storm is detected, for every transaction
    Delay 100 milliseconds after ☐
                             before ☒
    the following transaction type(s)
        ☒ OPEN_COLLECTION
        ☐ GET_NOTE_INFO
        ☐ OPEN_NOTE
        ☐ UPDATE_MULT_NOTE
        ☐ Only delay 1 of every 5 transactions
Return 1040 as a numeric return value on the following transaction type(s)
        ☐ OPEN_COLLECTION
        ☐ GET_NOTE_INFO
        ☐ OPEN_NOTE
        ☒ UPDATE_MULT_NOTE Describe the transaction storm to trigger the above action:
Detected Transaction Storm ID:
Definition for server name (or * for all) APPSV011
Number of consecutive transactions: 100 with a maximum average 50 milliseconds between.
OR
Consumed processing seconds: 1200
Stream initiated by client, server or either: CLIENT
Stream initiated by user/server name (or * for all): Wallace Hapgood
Beginning between the following times 08:00 AM and 06:00 PM

SESSION-BASED SERVER TRANSACTION STORM CONTROLS

BACKGROUND

Embodiments of the inventive subject matter generally relate to the field of transactional computer systems, and, more particularly, to controlling transaction storms on transactional computer systems.

It is common for database applications, enterprise messaging and collaboration applications to have streams sending units of work (i.e., transactions) to various types of services resident on servers. It is possible that services can be overwhelmed by the load caused by high numbers of transactions, which can cause and have caused catastrophic failure. In hosting these solutions in Software as a Service (SaaS) offerings, sessions and streams can persist and the sources of potentially destructive load increase in number. Servers, even clustered servers, typically have hard, finite resources and when the available resources are inequitably consumed, normal production throughput is endangered. Service outages can be quite costly to a business. For example, in a typical SaaS business where up time is linked directly to revenue, the cost of such outages can be high. During these outages, software support and on-premise administrative personnel can struggle to determine where the offending stream is originating and then attempt to determine both tactical and strategic approaches to alleviate it. The proliferation of third-party middleware and custom solutions creates variations of configurations that can make it difficult to describe or contain the flow of transactions such that resources are equitably consumed.

SUMMARY

System and computer program product embodiments include a transaction storm detection engine configured to receive a series of transactions in a data stream for an authenticated network session. The detection engine determines whether the transactions form a transaction storm. In response to determining that the transactions are a transaction storm, metrics associated with the transaction storm are presented along with actions that can be applied. One or more actions may be selected to be applied in a subsequently detected transaction storm.

BRIEF DESCRIPTION OF THE DRAWINGS

The present embodiments may be better understood, and numerous objects, features, and advantages made apparent to those skilled in the art by referencing the accompanying drawings.

FIG. 4 illustrates an example user interface form used to configure various parameters for use in detecting transaction storms.

FIG. 5 illustrates an example user interface for presenting information related to a transaction storm.

FIG. 7 illustrates an example user interface form that may be used to provide input parameters specifying remediation actions to be performed upon detection of a transaction storm.

FIG. 8 illustrates an example user interface form providing transaction sequence information.

FIG. 9 is an example user interface form that illustrates further actions that may be specified and stored for application to transaction storms.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

In general, the embodiments of the invention detect transaction storms in data streams associated with authenticated network sessions, and apply actions designed to remediate or mitigate the effect of a transaction storm. A transaction storm is a series or stream of closely packed transactions where the frequency and resource consumption of the series of transactions has the potential to cause deleterious effects within a system. Such deleterious effects can include reduced response times caused by overuse of resources due to the transaction storm or service outages when processor, memory or network resources become unavailable due to a transaction storm.

Figure 1:
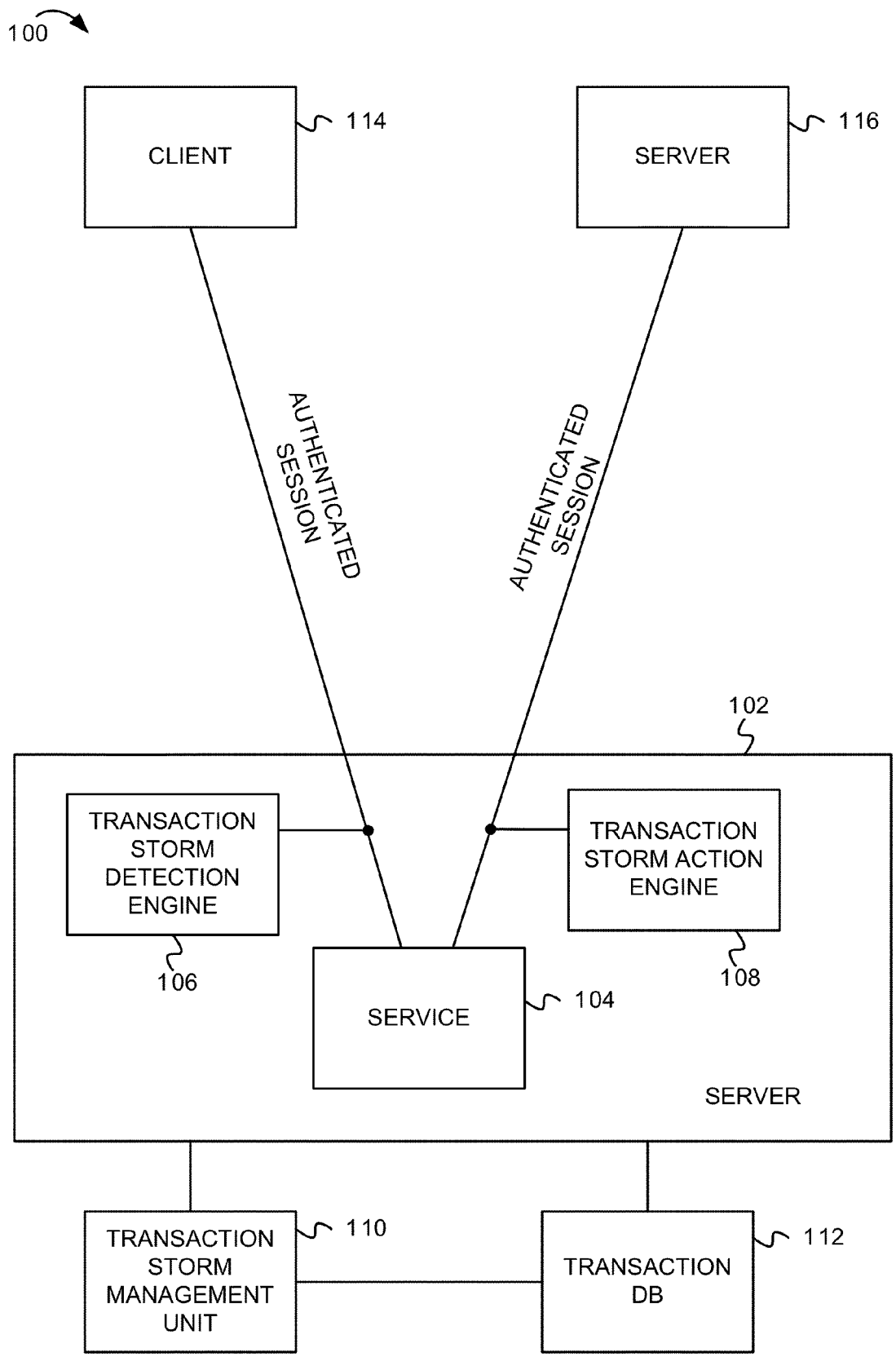
FIG. 1 depicts components of a system for detecting and controlling transaction storms.

FIG. 1 depicts components of a system 100 for detecting and controlling transaction storms. In some embodiments, system 100 includes a server 102, a transaction storm management unit 110 and a transaction database 112. Server 102 includes service 104, transaction storm detection engine 106 and transaction storm action engine 108. Service 104 can be any type of service that supports transactions. Examples of such services include database services, middleware services, etc. For the purposes of this specification, a transaction is a atomic set of one or more operations that are to be completed as a single unit of work. If any of the operations of the transaction fail, the whole transaction fails and none of the operations in the transaction have any effect. Examples of transactions include database transactions and remote procedure calls (RPC). However, the embodiments are not limited to any particular type of transaction.

Clients 114 and servers 116 may make use of service 104. For example, an application running on client 114 or server 116 may make use of a database service running on server 102. In order to make use of service 104, a client 114 or server 116 establishes an authenticated session with service 104. An authenticated session is a network session in which a user of an application on client 114 or server 116 that initiates transactions for service 104 has been positively identified. Typically such authentication takes place via a user identification and password combination. Authentication may also include authenticating a machine identification of client 114 or server 116.

After authentication, applications on client 114 or server 116 may send transactions for processing on service 104. Transaction storm detection engine 106 monitors the transaction requests issued by a client 114 or server 116 and stores attributes of the transactions to transaction database 112. Transaction storm detection engine 106 applies rules and heuristics to the transaction data in transaction database 112 to determine if a transaction storm is detected within an authenticated session. The rules for detecting a transaction storm may be configured by a system administrator or other party using transaction storm management unit 110 and stored in transaction database 112.

Upon detecting a transaction storm, transaction detection engine may store details about the transaction storm in transaction database 112. A user at transaction storm management unit 110 may be presented with a user interface that indicates the transaction storms that have been detected. In addition, transaction storm management unit 110 may provide a user interface allowing a user to configure actions to be applied in subsequently detected transaction storms.

In some embodiments, transaction storm action engine 108 receives an indication of a transaction storm in progress and applies actions configured using transaction storm management unit 110 to attempt to mitigate the impact of the transaction storm.

Monitoring of transactions in an authenticated network session and applying actions to transactions may take place at several levels. For example, in some embodiments, detection engine 106 and action engine 108 may intercept and inspect packets prior to delivery to service 104 or after issuance by service 104. In such embodiments, detection engine 104 and action engine 106 have knowledge of the application layer data formats of data packets exchanged between client 114 and service 104 or server 116 and service 104. Further, detection engine 106 and action engine 108 may maintain state information regarding the network session between a client 114 or server 116 and service 104. Such state information is thus maintained separately from the application or service that is intended to receive the transaction and execute the transaction.

In alternative embodiments, service 104 may provide an API (application program interface) for use by detection engine 106 and action engine 108 in detecting transactions and determining session state.

Various combinations of the elements illustrated in FIG. 1 may be possible as will be appreciated by one of skill in the art having the benefit of the disclosure. For example, although one service is illustrated in server 102, multiple services could be present on a server 10. Similarly, multiple clients and servers may interact with a service and detection engine 106 and action engine 108 may monitor multiple authenticated sessions. Further, either or both of detection engine 106 and action engine 108 may be implemented as proxy services on a computer system between a client 114 or server 116 and service 104.

Further details on the operation of example embodiments are provided below with respect to FIGS. 2-10.

Figure 2:
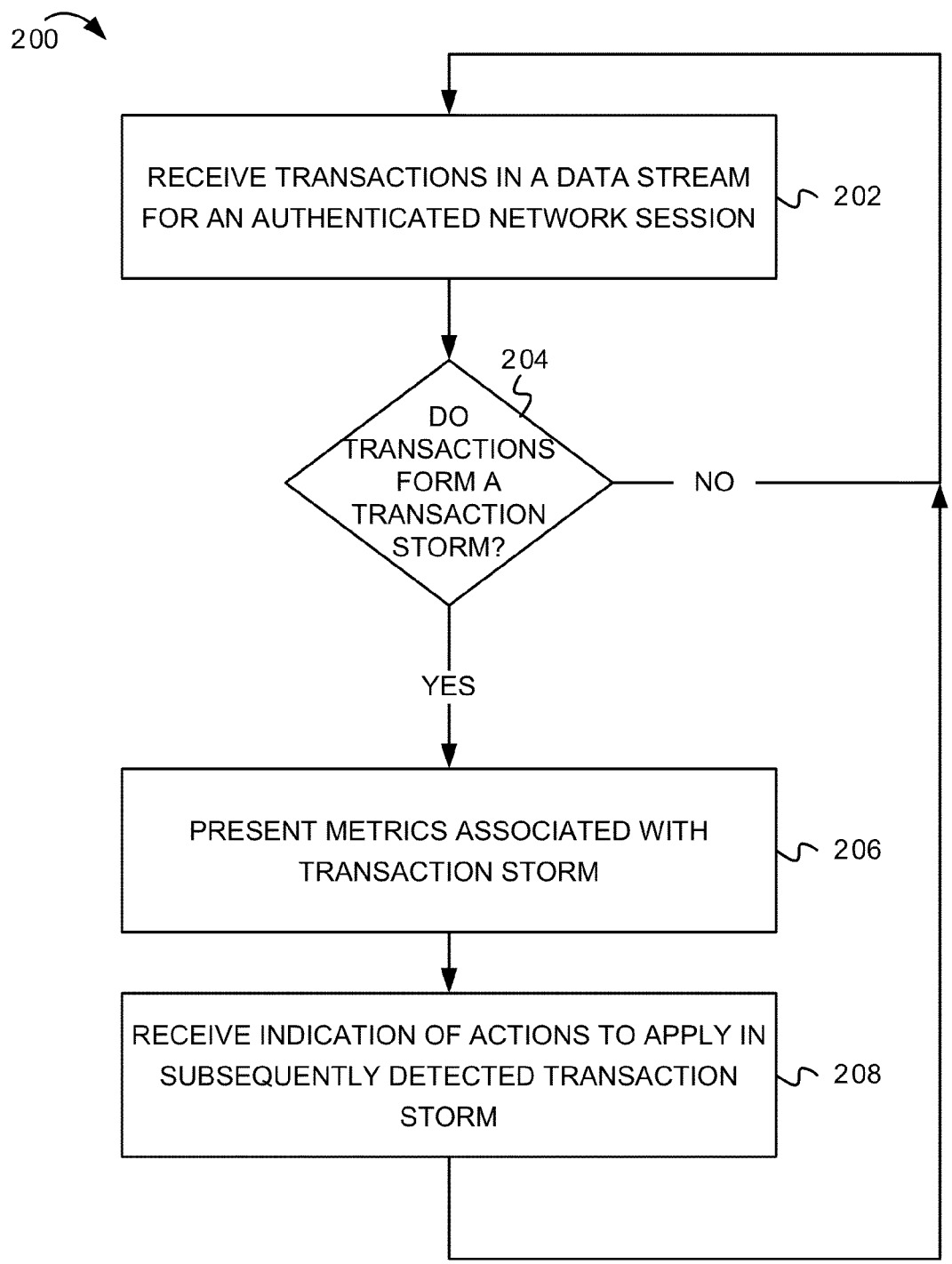
FIG. 2 is a flowchart illustrating a method for detecting transaction storms.

FIG. 2 is a flowchart illustrating a method 200 for detecting transaction storms. Method 200 begins at block 202 with receiving transactions in a data stream for an authenticated network session. As an example, a detection engine 106 may inspect packets between a client and a service (or a server and a service). As packets containing transaction data are received, attributes regarding the transactions and the state of transactions may be maintained. Such data may include the source of the transaction, a time that the transaction occurred, the duration of a transaction, a number of transactions, a time interval between transactions etc. The data may be stored in a database for analysis by detection engine 106 or other components.

At block 204, a decision is made as to whether transactions received at block 202 form a transaction storm. In some embodiments, various rules may be implemented to determine if a set of transactions form a transaction storm. In some embodiments, the rules may be implemented as a means for determining if a set of transactions were each generated by a human operator or generated by an automated operator on the assumption that transactions generated by a human operator should not be interfered with, but operations generated by an automated operator that may cause a transaction storm can be interfered with. As an example, a rule may specify that if the average interval between a predetermined or configurable number of transactions are less than a predetermined or configurable threshold, then a transaction storm exists. For instance, a rule may be configured such that if 100 transactions arrive during an authenticated session where the average time is less than fifty milliseconds between transactions, then a transaction storm exists for that session. It is unlikely that a human operator can generate such a transaction volume, therefore an automated process is likely the source of the transactions. It should be noted that a human operator may initiate automated operations that cause a transaction storm.

In some embodiments, a default set of rules operates to detect transaction storms. The default set of rules and parameters may be overridden by user input as will be further described below.

FIG. 4 illustrates an example user interface form 400 used to configure various parameters for use in detecting transaction storms. Input elements are indicated in bold and are underlined in FIG. 4. As shown in FIG. 4, a system administrator or other use may provide data specifying a server name on which transaction storm detection is to be implemented. A user may specify a specific server name or provide wildcard indicators to specify that all servers in a system are to monitor transactions for the existence of transaction storms. One or more wildcard characters can be included along with text partially specifying a name. For instance, a server name prefix or suffix can be included with one or more wild card characters to match a set of servers that can be a subset of the servers in an enterprise. In some embodiments, regular expressions may be used to specify a server name. The example user interface form 400 includes input parameters specifying a number of consecutive transactions and an average time between transactions that upon occurrence, triggers a transaction storm detection. Further, a consumed processing time may be configured such that if the processing time consumed by the number of transactions specified on the form exceeds the indicated amount, the transactions will be indicated to be a transaction storm. Other attributes that may be configured include an attribute specifying that the source of the transactions be a client, a server, or either. A particular user or system name may be specified as source filter of transactions, or alternatively, one or more wildcard characters may be specified indicating any user or server name may be a source of a detected transaction storm. As described above, one or more wild card characters may be included with text partially specifying a user or server name such that a subset of user names or server names may be selected according to a match with the text. The input text specifying the user or server name may be a regular expression. Additionally, a time period may be specified use in determining whether a transaction storm exists. Transactions outside of the specified time period may be ignored for purposes of detecting a transaction storm. Other parameters and rules may be configured for use in detecting transaction storms as will be appreciated by one of skill in the art having the benefit of the disclosure.

Returning to FIG. 2, if a transaction storm is not detected, the method returns to block 202 to continue monitoring incoming transactions. If a transaction storm is detected, flow continues to block 206.

At block 206, metrics associated with the detected transaction storm may be stored for presentation to a user, for example, a system administrator using a transaction storm management unit.

FIG. 5 illustrates an example user interface 500 for presenting information related to a transaction storm that may be presented as part of the operations performed at block 206. In some embodiments, a user interface screen 502 presents information including a transaction storm identifier assigned by the system to a detected transaction storm, a server identifier of the server affected by the transaction storm, a source identifier or originator of the transaction storm and a time interval during which the transaction storm occurred. Example user interface 500 includes a transaction storm selection interface 504 that provides various options for viewing and specifying actions related to transaction storms. In some embodiments, selection interface 504 includes a view storm option, a define action option, a view storm details option and an advance action option. Each of the selected options may apply to a currently selected transaction storm provided on user interface screen 502. Thus in the example illustrated in FIG. 5, the actions in selection screen 504 will be applied to the transaction storm having the storm identifier "TSID10017."

Figure 6:
FIG. 6 illustrates an example user interface form for presenting detail information related to a transaction storm.

FIG. 6 illustrates an example user interface form 600 that is presented upon selection of "View Storm" from selection interface 504 (FIG. 5). In some embodiments, information presented about a transaction storm includes a transaction storm identifier that is used to identify a particular transaction storm; a server experiencing the transaction storm; the time the transaction storm occurred; the number of transactions within the storm and the average time between transactions; the total processing seconds consumed by the transactions in the transaction storm; whether the storm occurred in a data stream initiated by a client, a server or both; and an identifier of a user or server that initiated the data stream that included the transaction storm. In some embodiments, the processing seconds are wall clock seconds. In alternative embodiments, other time measurements can be used, including processor times if available. Those of skill in the art having the benefit of the disclosure will appreciate that other data could be included on form 600.

Returning to FIG. 2, at block 208, an indication of an action to be applied to subsequently detected storms is received. In some embodiments, actions to be applied to subsequently detected storms include introducing a delay between transactions. In further embodiments, the actions may include causing a transaction to return a predetermined or configured error code to the transaction initiator without submitting the transaction to a service 104.

FIG. 7 illustrates an example user interface form 700 that may be used to provide input parameters specifying remediation actions to be performed upon detection of a transaction storm in a data stream for a session. In some embodiments, user interface form 700 includes input parameters specifying a time delay to be introduced between transactions. Check boxes 702 and 704 can be used to indicate that the delay is to be introduced before or after a transaction. User interface form 700 also includes an input parameter specifying that an error code is to be returned in place of executing the transaction. User interface form 700 also includes parameters that are used to detect a transaction storm. In some embodiments, the parameters can be supplied by inputting a transaction storm identifier (e.g., "TSID10017" in the example shown in FIG. 7). The parameters used to determine what actions will be applied to a subsequently detected transaction storm may be different from the parameters used to initially detect a transaction storm. User input form 700 provides input parameters used to specify new values or modify existing values of parameters. For example, similar to storm detection parameters illustrated in FIG. 4, input parameters in user interface form 700 may include a server name on which transaction storm remediation actions are to be applied. The example user interface form 700 includes input parameters specifying a number of consecutive transactions and an average time between transactions that upon occurrence, triggers the transaction storm remediation actions specified on the form. Further, a consumed processing time may be configured such that if the processing time consumed by the number of transactions specified on the form exceeds the indicated amount, the transaction storm remediation actions will be initiated. Other attributes that may be configured include an attribute specifying that the source of the transactions be a client, a server, or either. A particular user or system name may be specified as being subject to the transaction storm remediation actions, or alternatively, one or more wildcard characters may be specified indicating any user or server name may be subject to transaction storm remediation actions. As described above, the one or more wildcard characters may be included with text that partially specifies a user or server name such that a subset of user names or server names in an enterprise may be specified. Additionally, a time period may be specified use in determining when to apply transaction storm remediation actions. Other parameters and rules may be configured for use in initiating transaction storm remediation actions as will be appreciated by one of skill in the art having the benefit of the disclosure.

Figure 3:
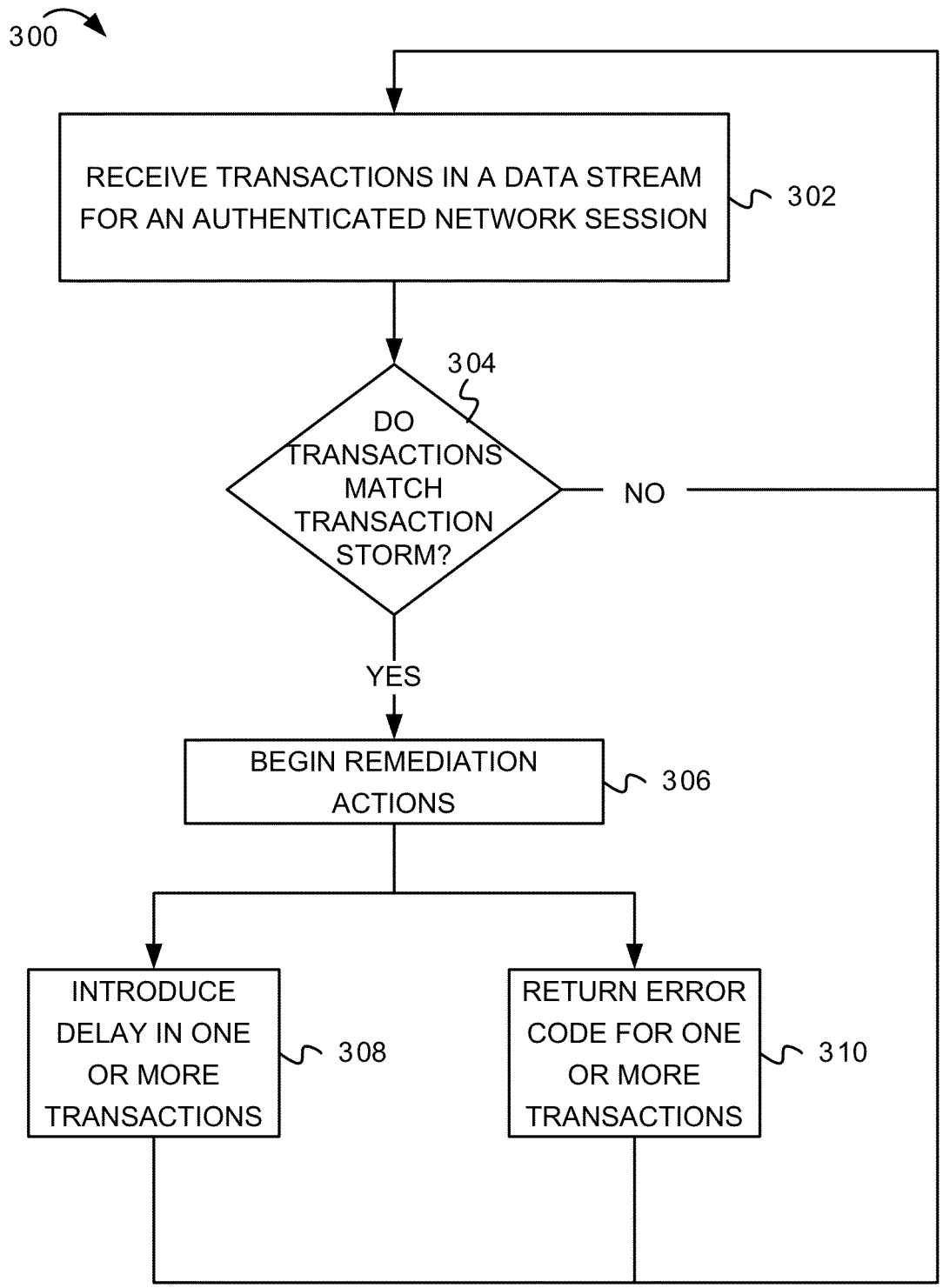
FIG. 3 is a flowchart illustrating a method for controlling transaction storms.

FIG. 3 is a flowchart illustrating a method 300 for controlling transaction storms. In some embodiments, method 300 is initiated when rules for applying actions to detected transaction storms have been supplied. Like method 200 described above, method 300 begins by receiving transactions in a data stream for an authenticated network session. In some embodiments, packet data is inspected and data regarding transactions and transaction states may be maintained.

At block 304, the data regarding the transactions and transaction states is compared against rules that have been specified for detecting actionable transaction storms to determine if an actionable transaction storm is detected. If no actionable transaction storm is detected, the method returns to bock 302 to receive further transactions for the data stream in the network session.

If the check at block 304 determines that an actionable transaction storm is detected, then at block 306 remediation actions are initiated. In some embodiments, the remediation actions at either or both of blocks 308 and 310 may be performed.

At block 308, a delay is introduced into one or more transactions. The magnitude of the delay may be predetermined or configurable. Further, the delay may be introduced before the transaction is presented to a service, or after a response to the transaction has been generated by the service for return to the transaction initiator (e.g., client 114 or server 116 of FIG. 1). In some embodiments, a default delay of one millisecond is introduced either before or after a transaction executes. The method then returns to block 302 to receive and analyzed further transactions, either for the current session to determine if the transaction storm continues in the session, or in other sessions to determine if other transaction storms are occurring.

At block 310, an error code is returned to a transaction initiator in place of delivering the transaction request to a service. The error code to be returned may be predetermined or configurable. Upon receiving the error code, the transaction initiator may interpret the error code and take whatever action the transaction initiator determines appropriate for the error code. For example, an error code may be configured that is known to cause a transaction initiator to retry the transaction at a later time. Alternatively, the error code may be one that causes the transaction initiator to stop sending transactions. The transaction storm caused by the transaction initiator can be halted, because the transaction initiator ceases sending transactions as a result of the error code. The method then returns to block 302 to receive and analyze further transactions and data streams that may be part of other session to determine if a transaction storm exists in other sessions.

In some embodiments, transaction sequences may be identified within a storm and isolated by a detection engine 106. It is often the case that a transaction sequence will include a single instance of a first type of transaction followed by multiple instances of other types of transactions. The sequence may, but not necessarily be terminated by a single instance of a third type of transaction. In some embodiments, detection engine 106 can analyze transaction data in a transaction database to determine the presence of such sequences. The remedial actions can be tailored to such sequences as will be illustrated in FIGS. 8 and 9.

FIG. 8 illustrates an example user interface form 800 that in some embodiments may be presented in response to selection of a "Storm Detail" menu element from selection interface 504 of FIG. 5. Example user interface 800 includes a transaction storm summary portion 802, a transaction summary portion 804, and transaction sequence summaries including a first transaction sequence summary 806 and a second transaction sequence summary 808. Transaction storm summary portion 802 includes the same information as has been described above regarding FIG. 4.

Transaction summary portion 804 includes information about various types of transactions that were a part of the selected transaction storm. Such information can include the transaction type, a count of the number of times the transaction type occurred during the transaction storm, the total processing seconds associated with transactions having the transaction type, and disk reads and writes associated with transactions having the indicated transaction type. Those of skill in the art having the benefit of the disclosure will appreciate that other information could be gathered and included in the transaction summary portion.

As noted above, example user interface 800 includes information regarding transaction sequences that were detected in a selected transaction storm. In the example shown in FIG. 8, two transaction sequences were detected in the selected transaction storm. For each transaction sequence, information can be presented regarding the sequence. For example, the number of times a transaction sequence occurs can be provided. In addition, a relative ordering of transactions in the sequence can be indicated and a minimum and maximum count of the number of times a particular transaction occurs in the sequences can be provided. As an example, in a first transaction sequence summarized in transaction sequence summary portion 806, the form indicates that the sequence occurred 73 times. The sequence begins with a single "OPEN_COLLECTION" transaction, followed by repeated "GET_NOTE_INFO" and "OPEN_NOTE" transactions. The transaction sequence ends with a "UPDATE_MULT_NOTE" transaction, which occurred a minimum of once during a sequence and a maximum of 47 times during a sequence.

In the example presented in FIG. 8, it can be seen that the UPDATE_MULT_NOTE transaction, though having relatively few invocations, is the biggest consumer of the measured system resources. It can also be seen that detection engine 106 determined that an OPEN_COLLECTION transaction begins both types of typical sequences as illustrated in transaction sequence summaries 806 and 808.

FIG. 9 is an example user interface form 900 that illustrates further actions that may be specified and stored for application to transaction storms. Similar to the interface illustrated in FIG. 5, user interface form 900 includes input parameters that allow a delay to be introduced either before or after transactions. However, user interface form 900 provides further control for actions by providing for specification of particular types of transactions to delay. In the example illustrated in FIG. 9, user interface form 900 presents a list of the types of transactions detected during a selected storm. A user can specify which types of transactions are to be delayed, and whether the delay is to occur before or after the transaction type is executed. Thus actions can be specified that occur at the beginning or end of a loop that processes a series of transaction in a detected transaction sequence, thereby increasing the chances of completing units of work within the detected sequence. This also increases the probability that the transaction sequence itself will complete successfully. In addition, a user interface element is provided allowing a user to specify a frequency for introducing a delay (e.g., introduce a delay every fifth execution of the transaction type).

Similarly, user interface form 900 provides user interface elements allowing a user to specify a value to be returned by specific transaction types. Upon enabling such a rule, the value is returned to the transaction initiator and the transaction is not executed.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
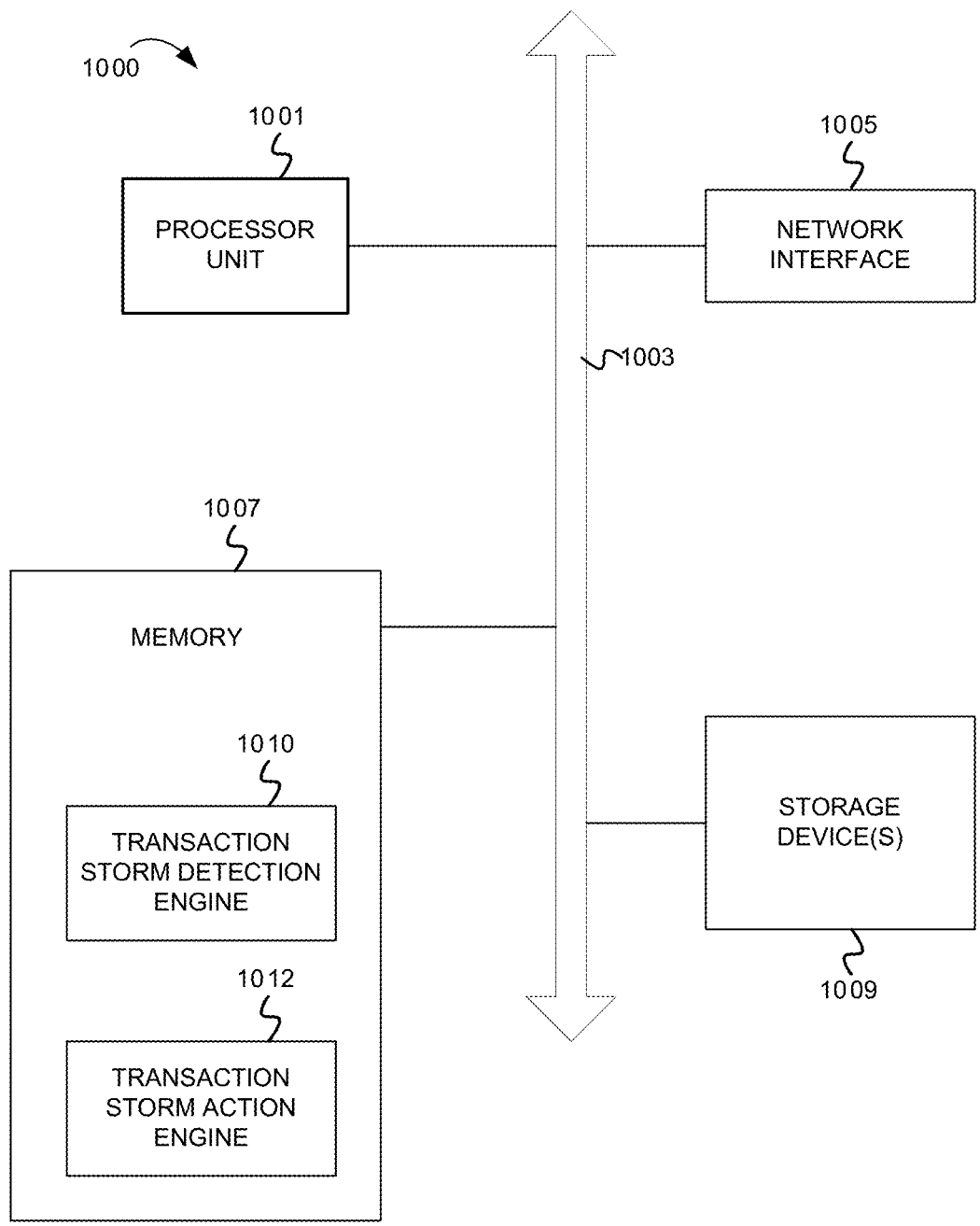
FIG. 10 depicts an example computer system.

FIG. 10 depicts an example computer system. A computer system includes a processor unit 1001 (possibly including multiple processors, multiple cores, multiple nodes, and/or implementing multi-threading, etc.). The computer system includes memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1003 (e.g., PCI, ISA, PCI-Express, HyperTransport®, InfiniBand®, NuBus, etc.), a network interface 1005 (e.g., an ATM interface, an Ethernet interface, a Frame Relay interface, SONET interface, wireless interface, etc.), and a storage device(s) 1009 (e.g., optical storage, magnetic storage, etc.). The system memory 1007 embodies functionality to implement embodiments described above. The system memory 1007 may include one or more functionalities that facilitate detecting transaction storms and performing actions to remediate transaction storms. For example, system memory 1007 may include code for a transaction storm detection engine 1010 and a transaction storm action engine 1012. Any one of these functionalities may be partially (or entirely) implemented in hardware and/or on the processing unit 1001. For example, the functionality may be implemented with an application specific integrated circuit, in logic implemented in the processing unit 1001, in a co-processor on a peripheral device or card, etc. Further, realizations may include fewer or additional components not illustrated in FIG. 10 (e.g., video cards, audio cards, additional network interfaces, peripheral devices, etc.). The processor unit 1001, the storage device(s) 1009, and the network interface 1005 are coupled to the bus 1003. Although illustrated as being coupled to the bus 1003, the memory 1007 may be coupled to the processor unit 1001.

While the embodiments are described with reference to various implementations and exploitations, it will be understood that these embodiments are illustrative and that the scope of the inventive subject matter is not limited to them. In general, techniques for detecting and remediating transaction storms as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for controlling transaction storms, the computer program product comprising:
   a computer readable memory storage device having computer usable code embodied therewith, the computer usable code comprising a computer usable code configured to:
      receive a plurality of transactions in a data stream for an authenticated network session;
      determine whether the plurality of transactions comprise a transaction storm;
      in response to the determination that the plurality of transactions comprise the transaction storm, presenting metrics associated with the transaction storm and a set of one or more actions; and
      receive an indication to apply at least one of the set of one or more actions in a subsequently detected transaction storm.

2. The computer program product of claim 1, wherein the computer usable code configured to determine whether the plurality of transactions comprise the transaction storm includes computer usable code configured to perform one or more of:
    determine whether an average interval between consecutive transactions of the plurality of transactions is less than a first threshold; and
    determine whether consumed processing time for the plurality of transactions exceeds a second threshold.

3. The computer program product of claim 2, wherein the computer usable code configured to determine whether the plurality of transactions in the data stream comprise the transaction storm includes computer usable code configured to perform one or more of:
    determine an originator identifier of the data stream; and
    determine that the plurality of transactions in the data stream occur during a configured time interval.

4. The computer program product of claim 1, wherein the computer usable code is further configured to apply the at least one of the set of one or more actions in the subsequently detected transaction storm.

5. The computer program product of claim 4, wherein the computer usable code is further configured to apply the at least one of the set of one or more actions includes computer usable code configured to perform one or more of:
    add a delay to one or more transactions of the plurality of transactions in the data stream; and
    return a value in response to detecting a transaction having a predetermined transaction type.

6. The computer program product of claim 5 wherein the computer usable code is further configured to determine a transaction sequence within the plurality of transactions, and wherein the computer usable code configured to add the delay to one or more transactions includes computer usable code configured to add the delay to a transaction in accordance with a transaction type of the transaction in the transaction sequence.

7. The computer program product of claim 5 wherein the computer usable code is further configured to:
    read network packets associated with the plurality of transactions; and
    maintain transaction state for the plurality of transactions independently of a service intended to execute the transactions based on application layer data in the network packets.

8. An apparatus comprising:
one or more processors;
a network interface coupled to the one or more processors;
a computer readable storage medium accessible to the one or more processors, the computer readable storage medium having computer usable program code embodied therewith, the computer usable program code comprising a computer usable program code configured to:
    receive a plurality of transactions in a data stream for an authenticated network session;
    determine whether the plurality of transactions comprise a transaction storm;
    in response to the determination that the plurality of transactions comprise the transaction storm, presenting metrics associated with the transaction storm and a set of one or more actions; and
    receive an indication to apply at least one of the set of one or more actions in a subsequently detected transaction storm.

9. The apparatus of claim 8, wherein the computer usable code configured to determine whether the plurality of transactions comprise the transaction storm includes computer usable code configured to perform one or more of:
    determine whether an average interval between consecutive transactions of the plurality of transactions is less than a first threshold; and
    determine whether consumed processing time for the plurality of transactions exceeds a second threshold.

10. The apparatus of claim 9, wherein the computer usable code configured to determine whether the plurality of transactions in the data stream comprise the transaction storm includes computer usable code configured to perform one or more of:
    determine an originator identifier of the data stream; and
    determine that the plurality of transactions in the data stream occur during a configured time interval.

11. The apparatus of claim 8, wherein the computer usable code is further configured to apply the at least one of the set of one or more actions in the subsequently detected transaction storm.

12. The apparatus of claim 11, wherein the computer usable code is further configured to apply the at least one of the set of one or more actions includes computer usable code configured to perform one or more of:
    add a delay to one or more transactions of the plurality of transactions in the data stream; and
    return a value in response to detecting a transaction having a predetermined transaction type.

13. The apparatus of claim 12, wherein the computer usable code is further configured to determine a transaction sequence within the plurality of transactions, and wherein the computer usable code configured to add the delay to one or more transactions includes computer usable code configured to add the delay to a transaction in accordance with a transaction type of the transaction.

14. The apparatus of claim 13, wherein the computer usable code configured to determine the transaction sequence includes computer usable code configured to:
    identify within the plurality of transactions an instance of a transaction having a first transaction type executed once followed by a plurality of instances of transactions having transaction types different from the first transaction type.

* * * * *